United States Patent
Vittal

(10) Patent No.: US 10,945,121 B2
(45) Date of Patent: Mar. 9, 2021

(54) SERVICES CAPABILITY SERVER TRIGGERED SERVICE CAPABILITY EXPOSURE FUNCTION CONNECTION ESTABLISHMENT TO SUPPORT NON IP DATA DELIVERY

(71) Applicant: MAVENIR NETWORKS, INC., Richardson, TX (US)

(72) Inventor: Shwetha Vittal, Bangalore (IN)

(73) Assignee: Mavenir Networks, Inc., Richardson, TX (US)

( * ) Notice: Subject to any disclaimer, the term of this patent is extended or adjusted under 35 U.S.C. 154(b) by 0 days.

(21) Appl. No.: 16/271,373

(22) Filed: Feb. 8, 2019

(65) Prior Publication Data
US 2019/0253875 A1   Aug. 15, 2019

Related U.S. Application Data

(60) Provisional application No. 62/628,531, filed on Feb. 9, 2018.

(51) Int. Cl.
| | |
|---|---|
| *H04W 8/24* | (2009.01) |
| *H04W 4/70* | (2018.01) |
| *H04W 8/08* | (2009.01) |
| *H04W 92/18* | (2009.01) |
| *H04L 29/12* | (2006.01) |
| *H04W 36/00* | (2009.01) |
| *H04W 8/04* | (2009.01) |

(52) U.S. Cl.
CPC .......... *H04W 8/24* (2013.01); *H04L 61/3075* (2013.01); *H04W 4/70* (2018.02); *H04W 8/04* (2013.01); *H04W 8/08* (2013.01); *H04W 36/0022* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2015/0181564 A1* | 6/2015 | Rao ..................... | H04W 40/246 370/329 |
| 2016/0277243 A1* | 9/2016 | Kim .................... | H04L 41/0816 |
| 2018/0035351 A1* | 2/2018 | Kodaypak ............ | H04W 76/10 |
| 2018/0279115 A1* | 9/2018 | Tanna .................... | H04W 8/04 |
| 2020/0022008 A1* | 1/2020 | Magee .................... | H04W 8/20 |

OTHER PUBLICATIONS

Third Generation Partnership Project (3GPP) technology standards [TS 23.682] Architecture enhancements to facilitate communications with packet data networks and applications (Release 15.2). Sep. 2017.

(Continued)

*Primary Examiner* — Brian S Roberts
(74) *Attorney, Agent, or Firm* — Ohlandt, Greeley, Ruggiero & Perle, LLP

(57) ABSTRACT

There is provided a system, method, and interfaces for control plane device triggering for a Public Land Mobile Network Packet Data Network (PDN). The network is configured to employ triggering via a T6a interface for an originating Machine-type communication server request to a Service Capability Exposure Function Server to initiate a PDN connection for User Equipment.

37 Claims, 11 Drawing Sheets

(56) References Cited

OTHER PUBLICATIONS

Third Generation Partnership Project (3GPP) technology standards [TS 29.128] Mobility Management Entity (MME) and Serving GPRS Support Node (SGSN) interfaces for interworking with packet data networks and applications (Release 14.3). Jun. 2017.
Third Generation Partnership Project (3GPP) technical reports [TR 23.720] Study on architecture enhancements for Cellular Internet of Things (Release 13). Mar. 2016.
Third Generation Partnership Project (3GPP) technology standard [TS 29.337] Diameter-based T4 Interface for communications with packet data networks and applications (Release 14.1). Jun. 2017.
Third Generation Partnership Project (3GPP) technology standard [TS 29.336] Home Subscriber Server (HSS) diameter interfaces for interworking with packet data networks and applications (Release 14.2). Jun. 2017.
Third Generation Partnership Project (3GPP) technology standard [TS 29.368] Tsp interface protocol between the MTC Interworking Function (MTC-IWF) and Service Capability Server (SCS) (Release 14.2). Jun. 2017.
Third Generation Partnership Project (3GPP) technology standard [TS 24.301] Non-Access-Stratum (NAS) protocol for Evolved Packet System (EPS); Stage 3 (Release 13). Dec. 2014.
Third Generation Partnership Project (3GPP) technology standard [TS 23.401] Evolved Universal Terrestrial Radio Access Network (E-UTRAN) access (Release 15.0). Jun. 2017.
Third Generation Partnership Project (3GPP) technology standard [TS 22.368] Study on enhancements for Machine-Type Communications (MTC) v 14.0.1. Aug. 2017.
Third Generation Partnership Project (3GPP) technology standard [TS 23.888] System improvements for Machine-Type Communications (MTC) 11.0.0. Sep. 2012.
Third Generation Partnership Project (3GPP) technical reports [TR21.905] Vocabulary for 3GPP Specifications (version 14.1.1 Release 14). Jun. 2017.

* cited by examiner

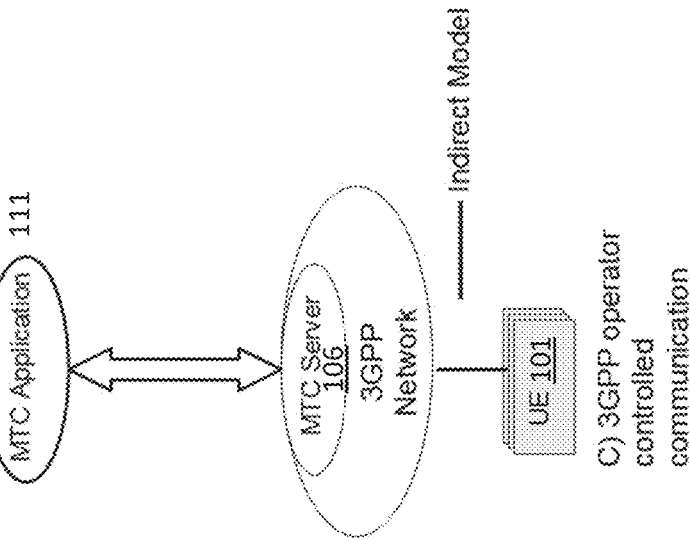
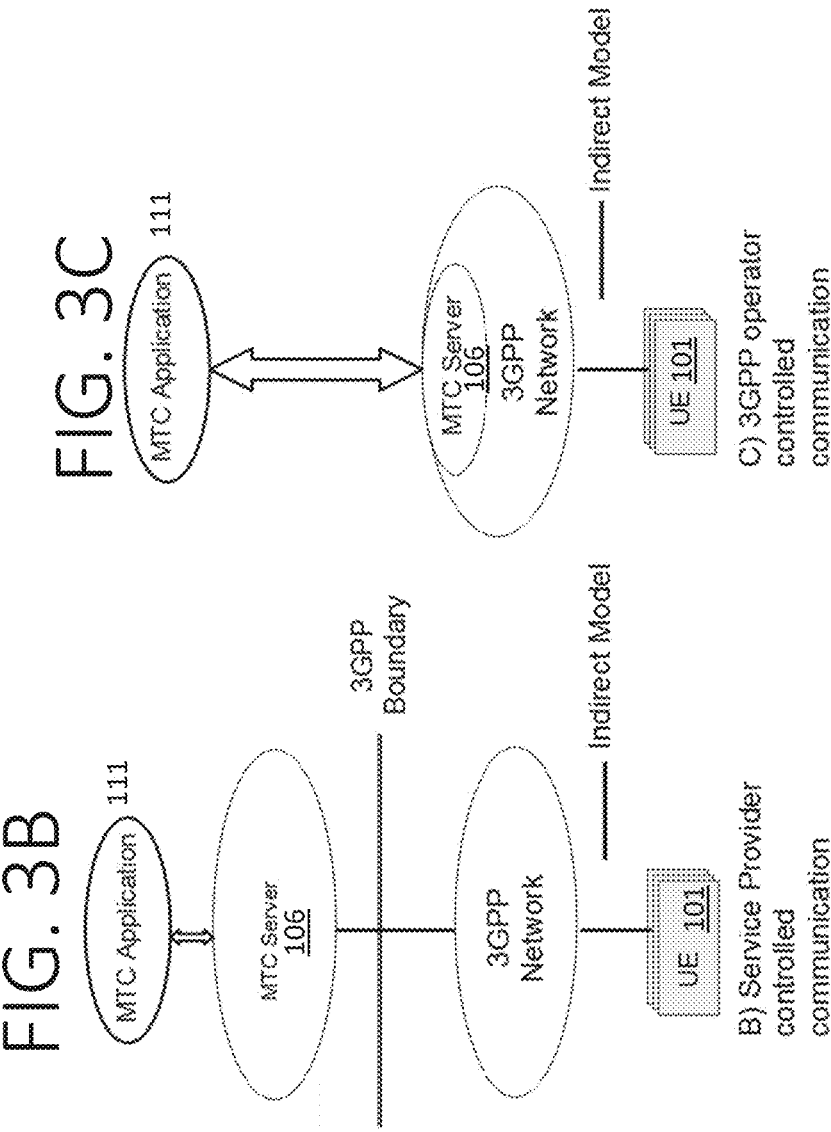
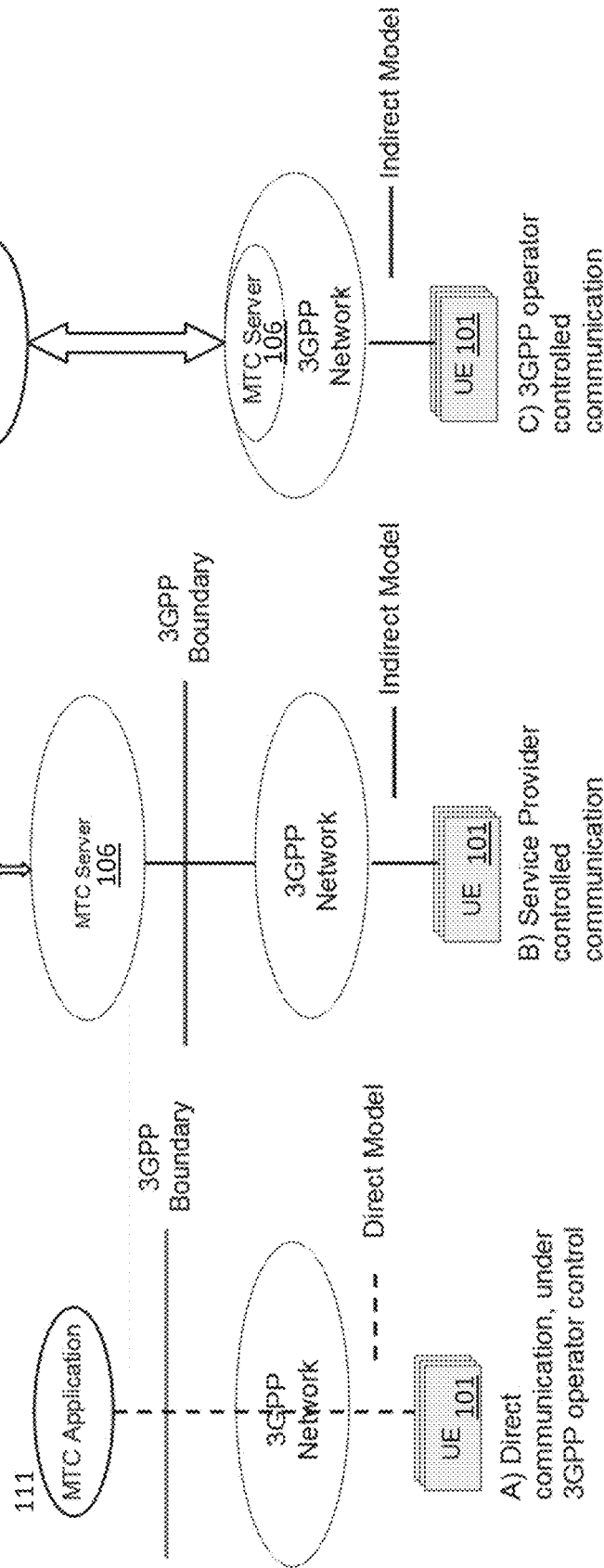

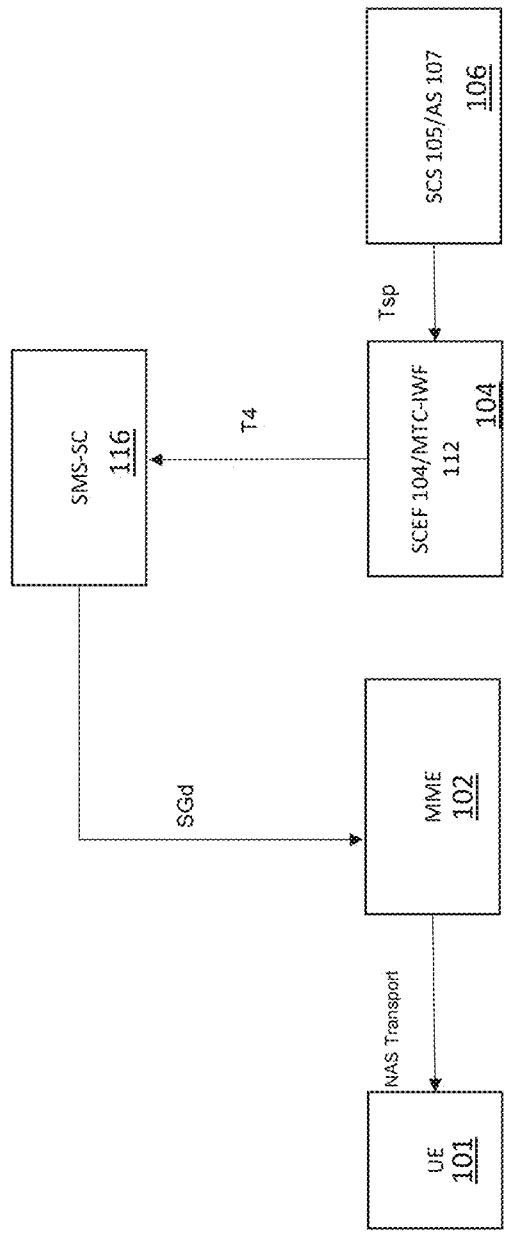
FIG. 4A Conventional Triggering

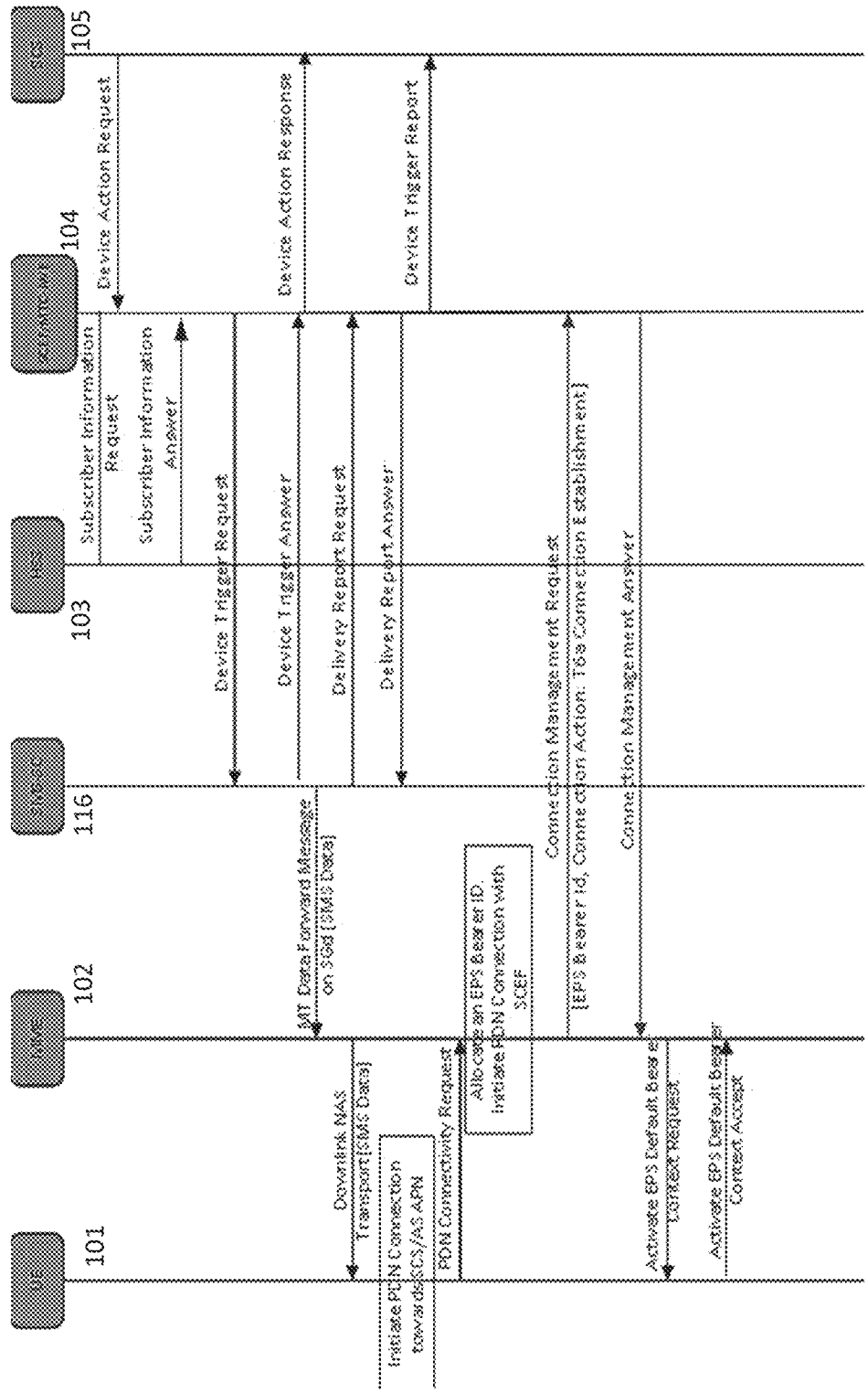
FIG. 4B Conventional Triggering

PDN type value (octet 3)
Bits
3 2 1
0 0 1    IPv4
0 1 0    IPv6
0 1 1    IPv4v6
1 0 1    non IP All other values are reserved.

Bit 4 to 8 of octet 3 are spare and shall be coded as zero.

PDN address information (octet 4 to 15)

If PDN type value indicates IPv4, the PDN address information in octet 4 to octet 7 contains an IPv4 address. Bit 8 of octet 4 represents the most significant bit of the IPv4 address and bit 1 of octet 7 the least significant bit.

If PDN type value indicates IPv6, the PDN address information in octet 4 to octet 11 contains an IPv6 interface identifier. Bit 8 of octet 4 represents the most significant bit of the IPv6 interface identifier and bit 1 of octet 11 the least significant bit.

If PDN type value indicates IPv4v6, the PDN address information in octet 4 to octet 15 contains an IPv6 interface identifier and an IPv4 address. Bit 8 of octet 4 represents the most significant bit of the IPv6 interface identifier and bit 1 of octet 11 the least significant bit. Bit 8 of octet 12 represents the most significant bit of the IPv4 address and bit 1 of octet 15 the least significant bit.

If PDN type value indicates IPv4 or IPv4v6 and DHCPv4 is to be used to allocate the IPv4 address, the IPv4 address shall be coded as 0.0.0.0.

If PDN type value indicates Non IP, then UE shall understand that this PDN is for Non IP Data Transfer Via SCEF, towards the associated Non IP APN.

PDN address information element

FIG. 9

SERVICES CAPABILITY SERVER TRIGGERED SERVICE CAPABILITY EXPOSURE FUNCTION CONNECTION ESTABLISHMENT TO SUPPORT NON IP DATA DELIVERY

CROSS REFERENCE TO RELATED APPLICATION

The present application claims priority to U.S. Provisional Patent Application No. 62/628,531 filed on Feb. 9, 2018, the entirety of which is incorporated by reference hereby.

BACKGROUND OF THE DISCLOSURE

Field of the Disclosure

The present disclosure relates to a system and a method for cellular networks and Packet Data Networks.

Description of the Related Art

The 3GPP system provides transport, subscriber management and other communication services including various architectural Machine Type Communication (MTC) services such as control plane device triggering. The end-to-end communications between a MTC Application in User Equipment (UE) and a MTC Application in an external network uses services provided by the 3GPP system architecture, including services provided by a Services Capability Server (SCS). The SCS connects application servers (AS) to the 3GPP network to enable them to communicate through specific 3GPP defined services with UEs used for MTC. The 3GPP system network architecture includes the SCS, a Machine Type Communication Inter Working Function (MTC-IWF) and interfaces related to them to allow a MTC AS to communicate with MTC Devices. The MTC-IWF can be an integral functional entity within a Service Capability Exposure Function (SCEF).

Conventionally, a Device Trigger for device triggering is delivered from a SCS/AS using mobile terminated short message service (SMS) delivery to a UE, via a T4 interface between the MTC-IWF and a SMS-Service Center (SMS-SC), a SGd interface between the SMS-SC, a Mobility Management Entity (MME), and finally reaching the UE. The UE can then take further actions to initiate connection towards the SCS/AS with appropriate connection procedures to establish a Packet Data Network (PDN) connection towards the SCS. The MTC-IWF is a component that enables the SCS/AS to send device trigger messages to the SMS-SC and then the MME over the T4 and SGd interfaces, respectively. The MME handles the signaling related to mobility and security for a Radio Access Network (RAN). Conventionally, the MME supports SMS in its architecture to support indirect Device Trigger delivery with the SCEF/MTC-IWF via the T4 and SGd interfaces.

SUMMARY OF THE DISCLOSURE

The present disclosure provides to a system and a method for allowing a MTC UE 101 to be attached to a 3GPP based Evolved Packet Core (EPC) network without a PDN Connection by supporting a control plane for a Cellular Internet of Things (CIoT) Evolved Packet System (EPS).

The present disclosure also provides such a system and method in which indirect model and hybrid model of embodiments of a MTC architecture to support Non IP Data Delivery via a Service Capability Exposure Function (SCEF) provides a number of exemplary advantages, a few of which are given below.

The present disclosure further provides, for example, embodiments as described herein that can be configured to completely avoid device trigger and related signaling messages on Short Message Service-Service Centre (SMS-SC) interfaces, for example on a T4 interface and a SGd interface.

The present disclosure still further provides that the MME does not have to be configured to support SMS in the MME architecture.

The present disclosures yet further provides another exemplary advantage in that the signaling messages between a MTC UE and a SCS/AS are substantially reduced, thereby achieving the goal of a Non IP data transfer via a SCEF with indirect and hybrid models of communication between the MTC UE and the MTC AS.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Detailed Description, which is to be read in association with the accompanying drawings.

FIG. 3A illustrates an embodiment of a Direct Communication architecture for a MTC Application AS that connects directly to an operator network.

FIG. 3B illustrates an embodiment of an Indirect Communication architecture for service provider controlled connection of a MTC Application AS to an operator network.

FIG. 3C illustrates an embodiment of an Indirect Communication architecture for operator controlled connection of a MTC Application AS to an operator network.

FIGS. 4A-4B show a conventional Device Trigger delivery path via T4 and SGd interfaces.

FIG. 9 shows an embodiment of a PDN address element.

DETAILED DESCRIPTION OF THE EMBODIMENTS

Figure 1A:
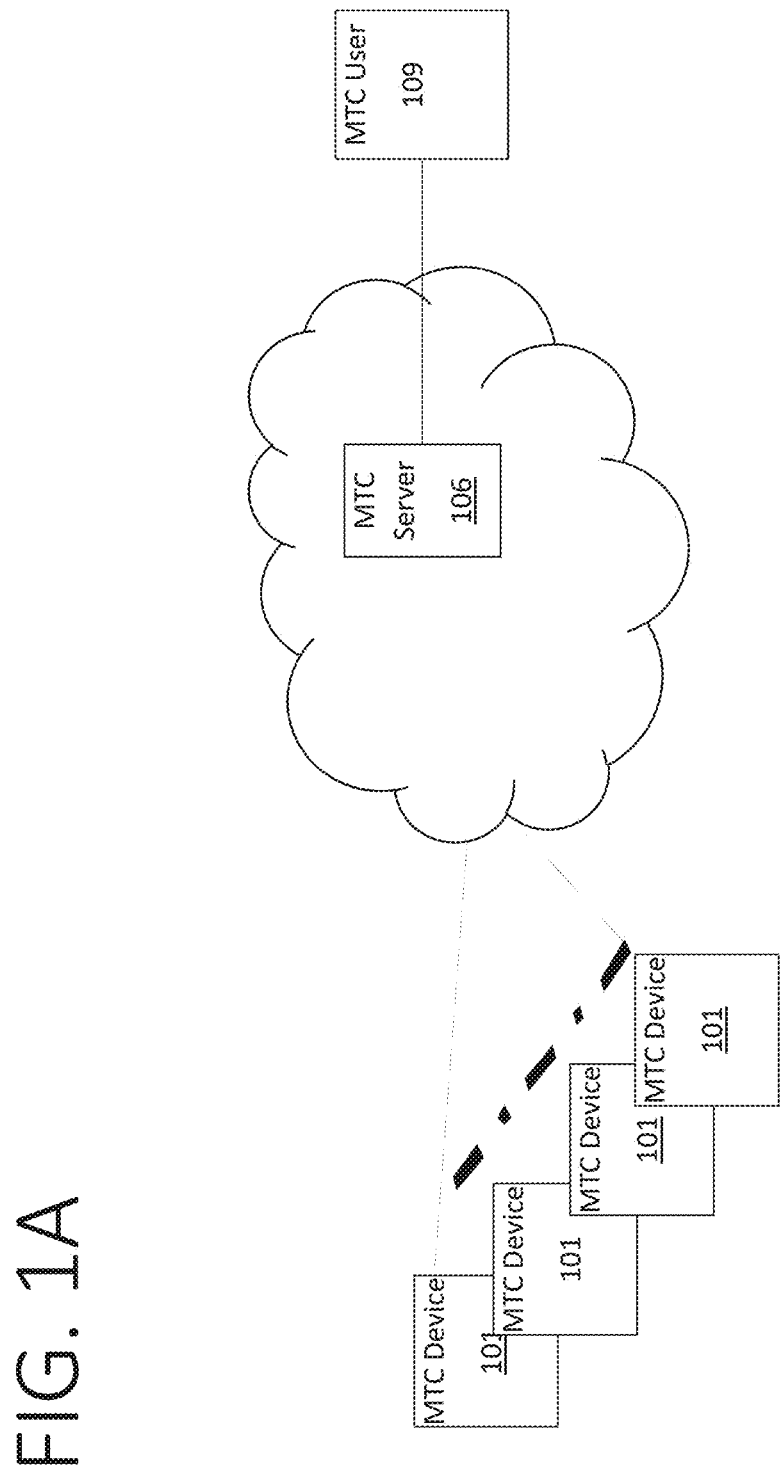
FIGS. 1A-1B illustrate embodiments of an architecture whereby MTC devices communicate with a MTC user.

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments can be methods, systems, media, or devices. Accordingly, the various embodiments can take the form of an entirely hardware embodiment, an entirely software embodiment, or an embodiment combining software and hardware aspects. The following detailed description is, therefore, not to be taken in a limiting sense.

Referring to the drawings and, in particular to FIG. 1, there is provided a Third Generation Partnership Project (3GPP) IP Multimedia Subsystem in accordance with embodiments of the present disclosure, which system is generally represented by reference numeral 100. The present application employs abbreviations, terms and technology defined in accord with Third Generation Partnership Project (3GPP) technology standards, including the following standards and definitions. Machine-type communication is a form of data communication that involves one or more entities that do not necessarily need human interaction. 3GPP technical specifications (TS) and technical reports (TR) TR-121.905, TS-22.368 and TS-23.682, incorporated by reference in their entirety hereby, define the machine type communication, related terms, and architecture reference models that follow.

Abbreviations

AS: Application Server
APN: Access Point Name
AVP: Attribute-value pair
CDF: Charging Data Function
CGF: Charging Gateway Function
CIoT: Cellular Internet of Things
CMR: Connection Management Request
DRX: Discontinuous Reception
ESM: EPS Session Management
EMM: EPS Mobility Management
EPS: Evolved Packet System
HSS: Home Subscriber Service
MME: Mobility Management Entity
MSISDN: Mobile Station International Subscriber Directory Number
MTC: Machine Type Communications
MTC-IWF: Machine Type Communications-Interworking Function
NIDD: Non-IP Data Delivery
PCO: Protocol Configuration Options
PDN: Packet Data Network
P-GW: PDN Gateway
PLMN: Public Land Mobile Network
PSM: Power Saving Mode
SCEF: Service Capability Exposure Function
SCS: Services Capability Server
SME: Short Message Entities
SMS-SC: Short Message Service-Service Centre
SRI: Send Routing Information
UE: User Equipment
MTC Device 101: A MTC Device 101 is user equipment (UE) equipped for Machine Type Communication, which communicates through a Public Land Mobile Network (PLMN) with MTC Server(s) 102 and/or other MTC Device(s) 101.
MME 102: A MME (Mobility Management Entity) 102 is configured to operate in the control plane. The MME 102 handles the signaling related to mobility and security for Radio Access Network (RAN) 108 access, e.g. the Evolved Universal Terrestrial Radio Access Network (E-UTRAN) access. The MME 102 is responsible for the tracking and paging of a UE 101 in idle-mode. It is the termination point of the Non-Access Stratum (NAS).

MTC Server 106: A MTC Server 106 is a server that communicates to the PLMN itself and to MTC Devices 101 through the PLMN. The MTC Server 106 can also have an interface, which can be accessed by the MTC User. The MTC Server 106 can provide services for other servers (e.g. The MTC Server 106 is a Services Capability Server (SCS) 105 (see 3GPP TS 23.682) for an Application Server (AS) 107); and/or provide services for applications and can host the applications (e.g. the MTC Server 106 is an Application Server 107).

MTC User 109: A MTC User 106 uses the service provided by the MTC Server 106.

The 3GPP system provides transport, subscriber management and other communication services including various architectural MTC services (e.g. control plane device triggering).

The end-to-end communications between the MTC Application 110 in a UE 101 and the MTC Application 111 in the external network uses services provided by the 3GPP system architecture, and can use services provided by a Services Capability Server (SCS) 105. The SCS 105 connects application servers (AS) 107 to the 3GPP network to enable them to communicate through specific 3GPP defined services with UEs 101 for MTC and with a MTC Interworking Function (MTC-IWF) 112 in the Home Public Land Mobile Network (HPLMN). The HPLMN identifies the Public Land Mobile Network (PLMN) in which a subscriber's profile is held. A Subscriber is an entity (associated with one or more users) that is engaged in a Subscription with a service provider. The subscriber is allowed to subscribe and unsubscribe services, to register a user or a list of users authorized to enjoy these services, and also to set the limits relative to the use that associated users make of these services. A MTC Subscriber is a subscriber, i.e. a legal entity having a relationship with the network operator to provide service to one or more MTC Devices 101.

MTC Interworking Function (MTC-IWF)

The 3GPP system provides transport, subscriber management and other communication services network architecture, including a SCS 105, a MTC-IWF 112, and interfaces for them to allow the MTC application server 110 to communicate with the MTC Device 101.

The MTC-IWF 112 is a control plane entity of the PLMN. The MTC-IWF 112 connects to SCS 105 with components in the PLMN (e.g., a Home Subscriber Server (HSS) 103, a Short Message Service-Service Center or IP-Short-Message-Gateway (SMS-SC/IP-SM-GW) 116, a Serving GPRS Support Node 114 (SGSN), a Mobility Management Entity (MME) 102, and a Charging Data Function/Charging Gateway Function (CDF/CGF) 115).

The interface between the MTC-IWF 112 and the SCS 105 is defined as a Tsp reference point.

The interface between the Service Capability Exposure Function (SCEF) and the MME 102 is defined as a T6 interface.

The interface between the MTC-IWF 112 and the SMS-SC is defined as a T4 interface.

A MTC-IWF 112 can be an integral functional entity within a Service Capability Exposure Function (SCEF) 104. As used for embodiments described herein, the two terms MTC-IWF 112 and SCEF 104 both refer the same single logical entity, the SCEF 104.

Figure 1B:
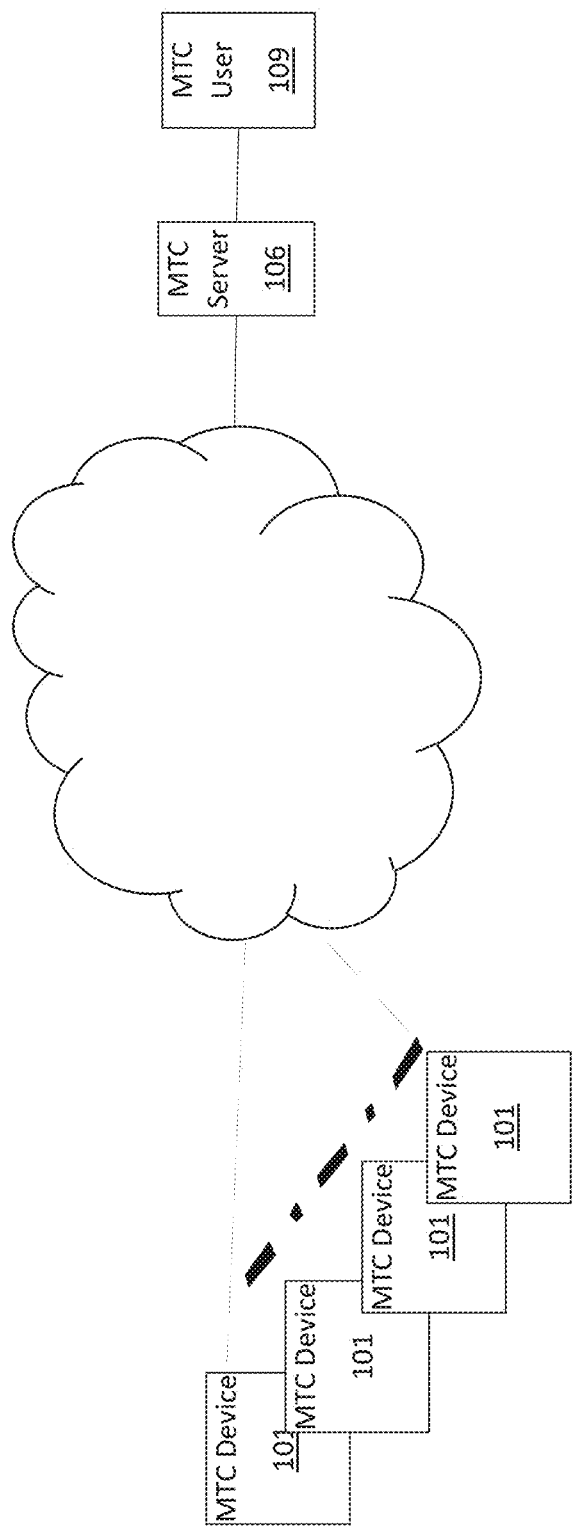
Figure 2:
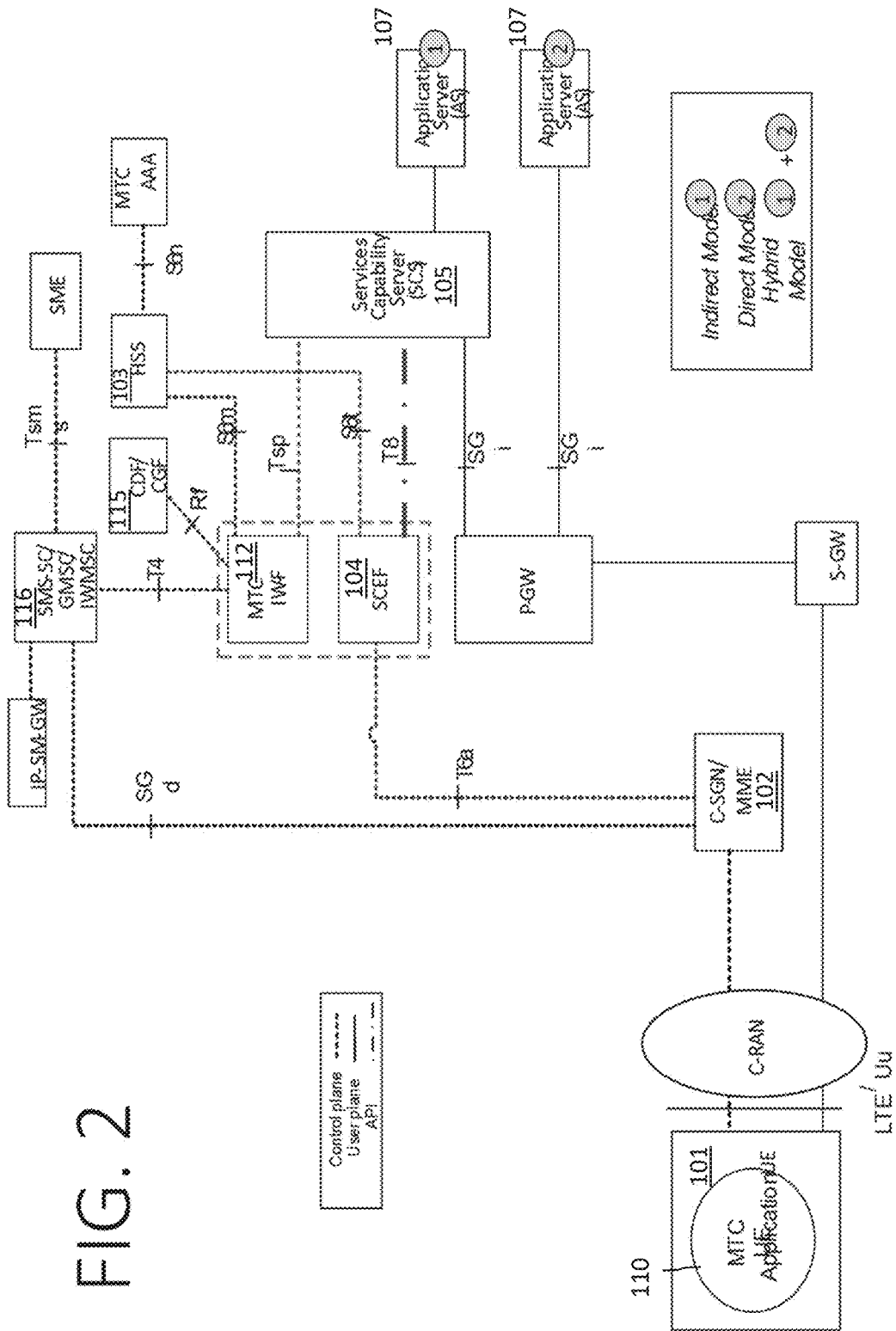
FIG. 2 illustrates an embodiment of an architecture whereby MTC devices communicate with a MTC user.

FIGS. 1A-1B and FIG. 2 show embodiments in which MTC devices 101 communicate with MTC user through MTC Server 106. Although FIG. 2 shows an embodiment of a Cloud-RAN (C-RAN) architecture, embodiments include both C-RAN and conventional RAN implementations.

FIG. 2 and FIGS. 3A-3B show embodiments of 3GPP Architecture for Machine-Type Communication. The MTC Application entities 110, 111 and the reference point API in the figures are illustrated to show the end-to-end view for MTC and simplify mapping to MTC specifications, for example as described and defined in various standardization organizations. As will be appreciated, in various embodiments, the MTC Application 111 can be collocated with the MTC Server 106. For example, FIG. 2 shows an embodiment of the architecture specified in 3GPP TS 23.682 by employing an SCEF 104 in an indirect model of communication. An architecture for Machine-Type Communication in non-roaming scenario as depicted in specification 3GPP TS 23.888, hereby incorporated by reference in its entirety, can also be employed.

Accordingly, embodiments as described herein can be employed for different architectural models of machine type of traffic for communication between the MTC Application 111 and the 3GPP system and based on the provider of the SCS 105. FIGS. 3A-3C show embodiments of the different architectures described above, which include:

Direct Model—As shown in FIG. 3A, the MTC Application AS 111 connects directly to the operator network in order to perform direct user plane communications with the UE without the use of any external SCS 105. The MTC Application AS 111 in the external network can make use of services offered by the 3GPP system.

Indirect Model—The MTC Application AS 111 connects indirectly to the operator network through the MTC Server 106 of a SCS 105 in order to utilize additional value added services for MTC (e.g. control plane device triggering). The SCS 105 is either:

MTC Service Provider controlled: As shown in FIG. 3B, the SCS 105 is an entity that may include value added services for MTC, performing user plane and/or control plane communication with the UE. A Tsp interface is regarded as an inter-domain interface for control plane communication; or 3GPP network operator controlled: As shown in FIG. 3C, a MTC Server 106 of the SCS 105 is a mobile operator entity that may include value added services for MTC and performs user plane and/or control plane communication with the UE, for example, making Tsp a control plane interface internal to the PLMN.

Hybrid Model: The MTC Application AS 111 uses a direct model and indirect models simultaneously in order to connect directly to an operator's network to perform direct user plane communications with the UE while also using a MTC Server 106 SCS 105. From the 3GPP network perspective, the direct user plane, communication from the AS 111 and any value-added control plane related communications from the SCS 105 are independent and have no correlation to each other even though they may be servicing the same MTC. The MTC Applications can be hosted by the MTC Application AS 111. When using the hybrid model, the MTC Service provider controlled SCS 105 and the 3GPP operator controlled SCS 105 may offer different capabilities to the MTC Applications.

As used herein the term "SCS/AS" 105 includes embodiments where the SCS 105, acting as a MTC Server 106, can host the MTC Application providing services to it. As described herein, in the indirect model, the SCS 105 and the Application Server AS 111 hosting Application(s) can be collocated.

Control Plane Device Triggering (Device Triggering) is the method by which a SCS 105 sends information to a UE 101 via the 3GPP based EPC network to trigger the UE 101 to perform application specific actions. One of these actions includes initiating communication with the SCS 105 for the indirect model or an Application Server in the network for the hybrid model of MTC architecture.

Service Capability Device Triggering is required when an IP address for the UE is not available or reachable by the SCS/AS 105. This is applicable when a Control Plane Cellular Internet of Things (CIoT) Evolved Packet System (EPS) Optimization feature is supported at MTC UE and 3GPP based EPC network.

Conventionally, a Device Trigger is delivered from SCS/AS 105 using mobile terminated short message delivery to an UE, via interfaces including a T4 between the MTC-IWF 112 and the SMS-SC, an SGd interface between SMS-SC and MME, finally reaching the UE through NAS transport messages. The UE further takes actions to initiate connection towards the SCS/AS 105 with appropriate EPS Connection procedures in order to establish a PDN connection towards the SCS 105 to help enable Non IP data transfer with SCS/AS 105 applicable in the deployed indirect, hybrid models.

The MTC-IWF 112 is the component that enables the SCS/AS 105 to send device trigger messages towards UE, through SMS-SC and MME 102 over T4 and SGd interfaces respectively. The MTC-IWF 112 can be an integral functional entity within the SCEF 104.

Conventionally, the MME 102 can support SMS in MME 102 architecture to support Device Trigger delivery for Non IP data transfer via the SCEF 104. FIGS. 4A-4B show a conventional Device Trigger delivery path via T4 and SGd interfaces. As shown in FIG. 4B, the call flows for a conventional device trigger delivery path via T4 and SGd interfaces are followed by a UE initiated SCEF 104 connection establishment to achieve Non IP data transfer between a MTC UE and MTC Application Server through the SCEF 104.

Figure 5:
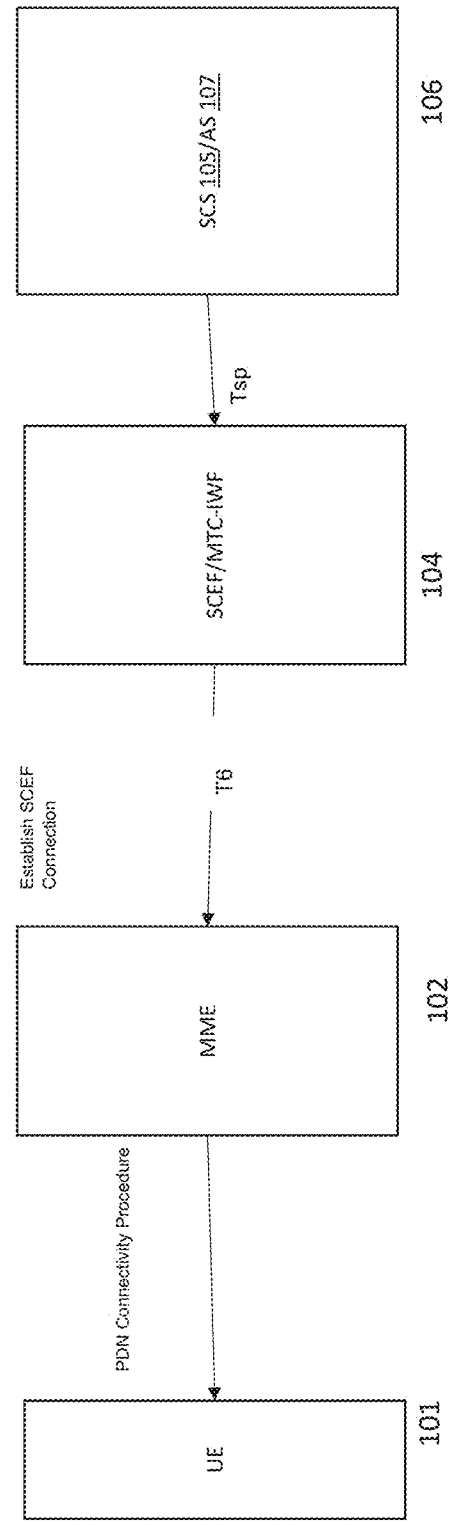
FIG. 5 illustrates a high level architecture and process flow for delivering a device trigger from a SCS/AS to a MTC UE to establish a PDN Connection between the MTC UE and a MTC AS to enable Non IP data exchange.
Figure 6:
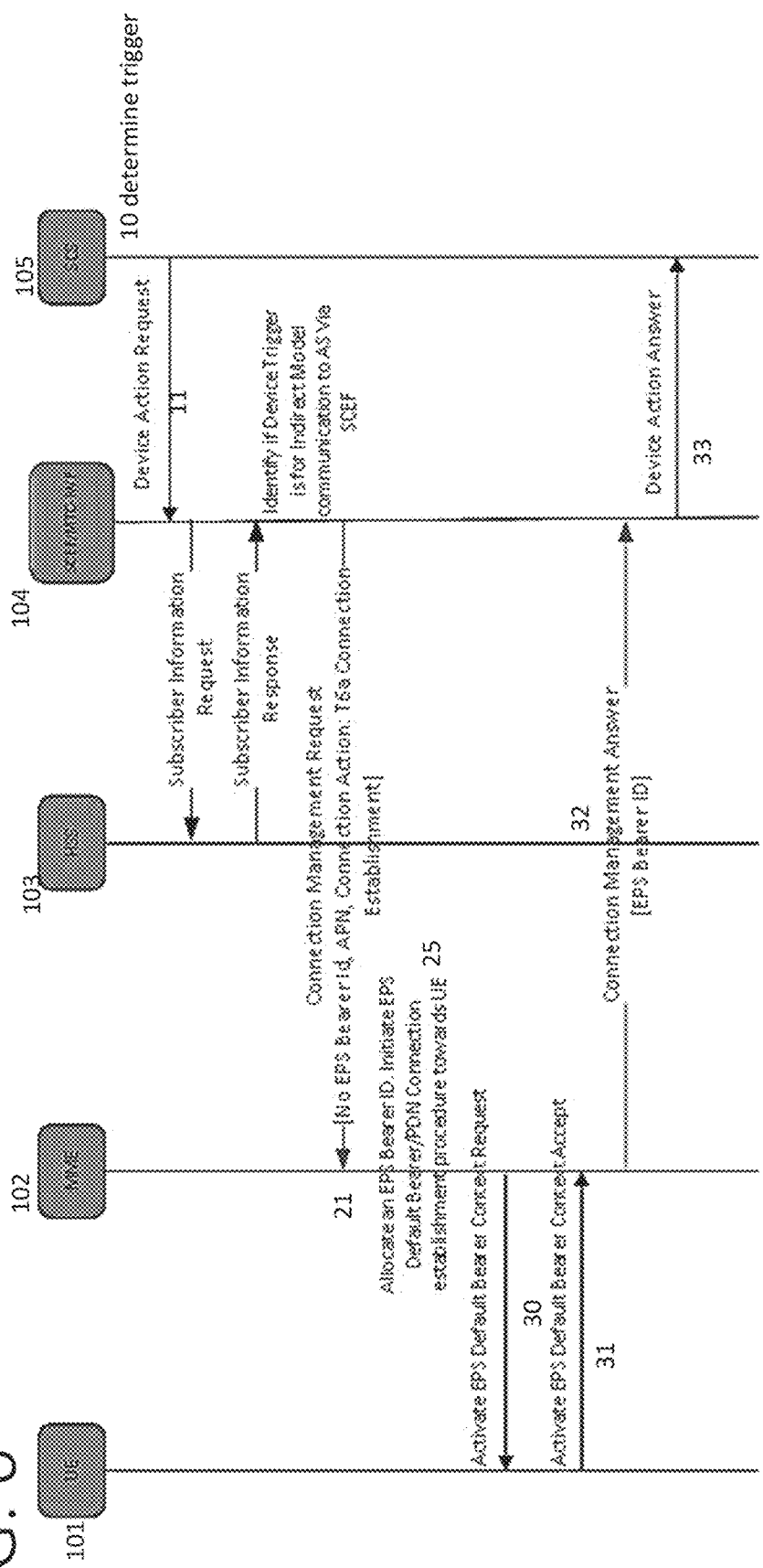
FIG. 6 shows an embodiment of a message flow for a device trigger delivery path and establishing SCEF PDN connection on a T6a interface between a SCEF and a MME.
Figure 7:
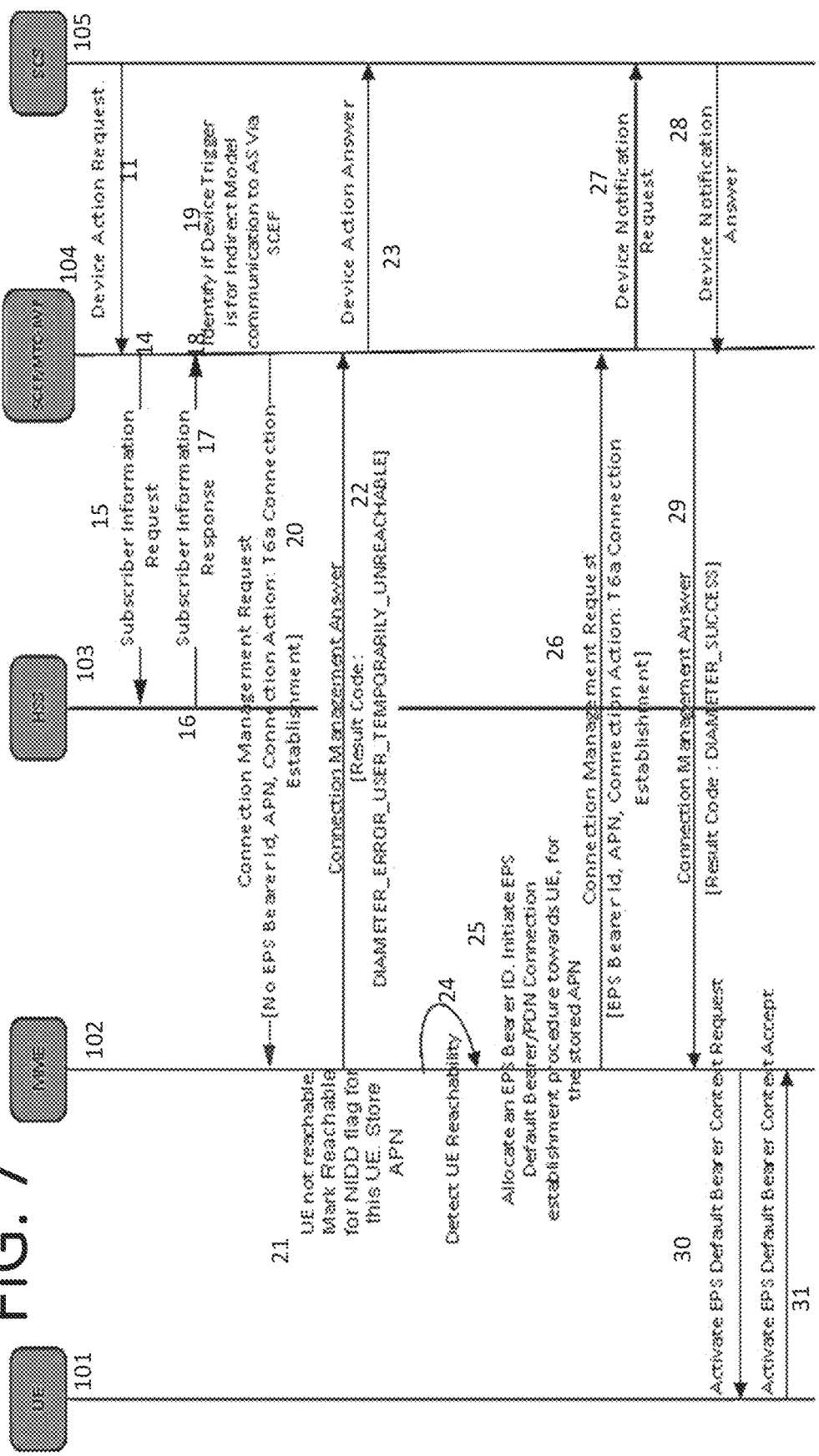
FIG. 7 shows an embodiment of a detailed call flow of a SCEF initiated PDN Connection establishment via T6a when an intended UE is not reachable.

FIGS. 5-7 show embodiments of an optimized technique for delivering a device trigger from an SCS/AS 105 to an MTC UE in order establish a PDN Connection between a MTC UE and a MTC AS to enable Non IP data exchange. In various embodiments, the optimized path is made via an existing Tsp interface between SCS/AS 105 and MTC-IWF 112, a T6a interface between the SCEF 104 and the MME, and an existing NAS Transport mechanism between the MME 102 and the UE. In embodiments, the components can be configured to completely avoid signaling on Diameter based T4 and SGd interfaces.

While embodiments are described with reference to a T6a interface, embodiments can include configurations using a T6b interface (i.e. between a SCEF 104 and a SGSN 114, not shown).

FIGS. 6 and 7 describe an embodiment of a call flow for a SCEF 104 initiated PDN Connection establishment. In an embodiment, the system is configured to employ triggering via a T6a interface toward the MTC Device 101 by way of the SCS 105, instead of employing a conventional SMS based device trigger delivery procedure. FIG. 6 shows an embodiment of a message flow for a device trigger delivery path and establishing SCEF 104 PDN connection on a T6a interface between a SCEF 104 and the MME. FIG. 7 shows an embodiment of a detailed call flow for the SCEF 104 initiated PDN Connection establishment via T6a as shown in FIG. 6 when an intended UE is not reachable (e.g. because UE 101 is in Power Saving Mode or extended idle mode (DRX)).

At block 10, the SCS 105 determines the need to trigger the device. If the SCS 105 has no contact details for an MTC-IWF 112, it can determine the IP address(es)/port(s) of the SCEF 104 by performing a DNS query using the External Identifier or using a locally configured MTC-IWF 112 identifier.

At block 11 the SCS 105 sends a Device Trigger Request message to the SCEF 104. Fields for the Device Trigger Request message include: Action Type, External Identifier or MSISDN, SCS Identifier, and Trigger Reference Number. In an embodiment, the Action Type field indicates "Device Trigger Via SCEF". In the embodiment, there is no need to send a Trigger-Data or related fields therefor (e.g.: priority, validity period, application port id) as no explicit device trigger procedure occurs towards the UE.

At block 12, the SCEF 104 checks that the SCS 105 is authorized to send trigger requests and that the SCS 105 has not exceeded its quota or rate of trigger submission over Tsp. If this check fails, at block 13 the SCEF 104 sends a Device Trigger Confirm message with a cause value indicating the reason for the failure condition and the flow stops at this step. Otherwise, the flow continues to block 14.

At block 14, the SCEF 104 derives the APN locally, using SCS Id and External ID received from SCS/AS 105, based on the local policies. At block 15, the SCEF 104 sends a Subscriber Information Request message to an HSS 103. Field for Subscriber Information Request message include the External Identifier or MSISDN and SCS Identifier, Service-Selection (APN), indicating Requested Service/service-ID as "Device Triggering On T6a". The SCEF 104 sends the Subscriber Information Request message to the HSS 103 to determine if the SCS 105 is authorized to trigger the UE to resolve the External Identifier or MSISDN to IMSI as well as to retrieve the related HSS 103 stored "Routing information", including the identities of the UE's 101 serving CN node(s).

At block 16, the HSS 103 verifies that the User Identity for whom data is asked exists in HSS 103 and whether the requesting/receiving SCS 105 is authorized to request/receive the specified service for the UE. The HSS 103 also checks that the APN sent in the Service-Selection AVP is subscribed for the subscriber identified by the given MSISDN or the External Identifier. At block 17, the HSS 103 sends the Subscriber. Information Response message to the SCEF 104. The Subscriber Information Response message includes IMSI and/or MSISDN as well as related "Routing information" including the serving node(s) identities. A HSS/HLR policy, which may be dependent on the VPLMN ID, can influence which serving node identities are returned. At block 18, if there is a failure condition, the SCEF 104 sends a Device Trigger Confirm message with a cause value indicating the reason for the failure condition and the flow stops. Failure conditions occur if a cause value indicates the SCS 105 is not allowed to send a trigger message to the UE, there is no valid subscription information, or an "Absent subscriber" is received from HSS 103 and the validity period of this trigger message is set to zero. If there is no failure condition, the flow continues at block 19.

At block 19, the MTC-IWF 112 contacts SCEF 104 for attempting a trigger delivery procedure via T6a interface. If there is an already existing T6a PDN connection, the MTC-IWF 112 can deliver the device trigger as DL user data to the UE via the SCEF 104 using a mobile terminated NIDD procedure. The mobile terminated NIDD procedure is described in 3GPP TS 23.682, incorporated in its entirety by reference hereby. Otherwise, the SCEF 104 shall initiate a new PDN Connection request towards the MME 102 on T6a interface, as shown in block 20.

At block 20, the SCEF 104 selects the MME 102 based on the service node ID information received from the HSS 103 in the Subscriber Information Answer as described at block 17. The SCEF 104 sends a Connection Management Request, which can include an External Identifier or MSISDN, IMSI, and a T6a Connection Action indicating "T6a Connection Establishment" APN message to the MME.

At block 21, the MME 102 identifies that the APN indicated in the request from SCEF 104 is a non IP based APN and detects if the UE is reachable. If UE is reachable, at block 30, it further initiates a EPS default bearer allocation and a PDN connection establishment procedure towards the UE, by sending a EPS Default Bearer Request message to support non IP Data transfer. The MME 102 need not verify if the APN sent by the SCEF 104 is valid, as the HSS will have already validated the APN when the SCEF 104 asked for Subscriber Information at block 17 while authorizing the mapped AS/SCS. The MME 102 indicates the relevant APN received from SCEF 104 in the request sent to UE. As shown in FIG. 6, if the UE is reachable, the flow then continues directly to activation of the EPS Default Bearer Content Request at block 30.

Otherwise, as shown in FIG. 7, if the MME 102 is aware of the UE being unreachable at block 21, for example, while using power saving functions e.g. UE Power Saving Mode (see section 4.5.4 of 3GPP TS 23.682) or extended idle mode DRX (see section 4.5.13 of 3GPP TS 23.682), then at block 22 MME 102 sends a Connection Management Answer command with a Result Code indicating that UE is temporarily not reachable message towards the SCEF 104. A Reachable for NIDD flag indicates that the MME 102 will notify the SCEF 104 when the MME 102 determines the UE 101 is reachable. The MME 102 stores the APN in an ESM context for this UE 101. The MME 102 also stores a mark Reachable for NIDD flag in an EMM context for this UE 101. At block 23, upon receiving Connection Management Answer command from MME, the SCEF 104 is configured to indicate the same to SCS/AS 105 in Device Action Answer message. The SCEF 104 implements a local timer with a Maximum Retransmission Timer, sent by MME, after which the SCEF 104 retries T6a connection management again. However, the process continues as shown in block 24 if MME 102 detects that UE 101 is reachable, even if within the time period of the local timer.

At block 24, the MME 102 is configured detect that the UE 101 is reachable. For example, the MME 102 is configured to detect the UE 101 is reachable when coming out of PSM mode by performing TAU, when initiating MO communication, and the like. The MME 102 can also detect when the UE 101 is about to become reachable, for example, when an extended idle mode DRX cycle is expiring, the MME 102 is anticipating a MO communication pattern for the UE 101, and the like. When the MME 102 detects the UE 101 is reachable or about to be reachable, the MME 102 sets a Reachable for NIDD flag set, then the MME 102 initiates a connection establishment procedure as shown at block 25. The MME 102 also clears the Reachable for NIDD flag from its EMM context.

At block 25, the MME 102 now initiates the T6a connection establishment procedure towards the SCEF 104, for the stored non IP APN, indicated from an SCEF 104 in an earlier T6a connection establishment as shown in FIG. 4B. At block 26, the MME 102 sends a Connection Management Request to the SCEF 104. A description of the connection establishment that can be used for embodiments as described herein is described in TS 23.682, the entirety of which is hereby incorporated by reference, starting at 5.13.1, step 2. At block 27, the SCEF 104 sends a Device Notification Request to the SCS/AS 105. SCEF 104 intimates to the SCS/AS 105 on the outcome of the entire device trigger delivery by sending Device Notification Request command to SCS/AS 105 on the Tsp interface. At block 28, the SCS 105 returns a Device Notification Answer to the SCEF 104, and at block 29 the SCEF 104 returns a Connection Management Answer to the MME.

At block 30, the EPS Default bearer gets established between MME 102 and UE 101 over NAS, as shown in both FIGS. 6-7. 3GPP TS 23.401 describes an Attach procedure (see Section 5.3.2) and 3GPP TS 24.301 describes a UE 101 Requested PDN Connection procedure (see Section 6.5.1) that can be employed for embodiments as described herein.

Continuing in both FIGS. 6-7, at block 31, the MME 102 receives confirmation from UE 101 through an Activate Default EPS Bearer Context Accept message. At block 32, the MME 102 confirms the SCEF for PDN Connection on T6a, with the EPS Bearer ID using a Connection Management Answer command. The new EPS Bearer assigned in this context is configured to be used by the SCEF 104 to support Non IP Data Transfer between UE 101 and AS.

Upon receiving the confirmation from the MME, at block 33, the SCEF 104 sends a Device Action Answer/Confirm message to the SCS 105. The Device-Notification AVP in Device Action Answer command is set with value "Device Trigger Via SCEF 104" to indicate the confirmation that the Device Trigger Request has been accepted by UE 101 and the AS can immediately start sending non IP data towards this UE 101 as well be ready to accept the same from UE 101.

Tsp Interface

This section describes a Tsp interface configured to support SCS Initiated Device Trigger Delivery to establish SCEF PDN Connection for embodiments as described herein.

Device Action Request Command from the SCS 105 to SCEF 104 is configured to include the Action Type AVP with a value "Device. Trigger Via SCEF". Hence, the Action Type AVP shall be defined with following values:

Device Trigger Request (1)
This value indicates a device trigger request and is used:
 in the Device-Action AVP of the Device-Action-Request command;
 in the Device-Notification AVP of the Device-Action-Answer command.
Delivery Report (2)
This value indicates a delivery report sent from MTC-IWF 112 to the SCS 105 and is used:
 in the Device-Notification AVP of the Device-Notification-Request command.
Device Trigger Recall (3)
This value indicates a device trigger recall request and is used:
 in the Device-Action AVP of the Device-Action-Request command;
 in the Device-Notification AVP of the Device-Action-Answer command.
Device Trigger Replace (4)
This value indicates a device trigger replace request and is used:
 in the Device-Action AVP of the Device-Action-Request command;
 in the Device-Notification AVP of the Device-Action-Answer command.
MSISDN-less MO-SMS Delivery (5)
This value indicates the delivery of an MSISDN-less MO-SMS and is used in the Device-Notification AVP of the Device-Notification-Request command.
Device Trigger Via SCEF (6) This value indicates a device trigger to be delivered via SCEF and is used:
 in the Device-Action AVP of the Device-Action-Request command;
 in the Device-Notification AVP of the Device-Action-Answer command;
 in the Device Notification AVP of the Device-Notification-Request command.

S6m Interface Changes

This section details a configuration of an S6m interface to support SCS Initiated Device Trigger Delivery to establish SCEF PDN Connection for embodiments of the Indirect Model of Machine Type Communication Architecture as described herein.

A Subscriber Information Request Command from the MTC-IWF 112 to the HSS is configured to include service-selection AVP to allow the HSS to validate the same. An embodiment of the Subscriber Information Retrieval Command is configured as shown in Table 1.

TABLE 1

Subscriber Information Retrieval (Request)

| Information Element Name | Mapping to Diameter AVP | Cat. | Description |
| --- | --- | --- | --- |
| User Identity (see 6.4.2 of 29.336) | User-Identifier | M | This Information Element shall contain the identity of the UE. This is a grouped AVP containing either an External Identifier, an MSISDN or an IMSI (exactly one, and only one, of those identifiers shall be included in the request). |
| Requested Service (see 6.4.3 of 29.336) | Service-ID | O | This Information Element shall contain the service requested by the SCS. In this release, the Device Triggering, Device Triggering on T6a and SMS_MO services are supported. |
| SCS Identity (see 6.4.4 of 29.336) | SCS-Identity | O | This Information Element shall contain the identity of the Service Capability Server that is requesting a service to be applied to a certain UE. When the Service-ID indicates DEVICE_TRIGGER (0) or SMS_MO (1), the SCS-Identity shall be formatted as an E.164 address as described in section 6.4.4 of 29.336 |

TABLE 1-continued

Subscriber Information Retrieval (Request)

| Information Element Name | Mapping to Diameter AVP | Cat. | Description |
|---|---|---|---|
| Service-Selection (See section 8.4.49 of 29.336) | Service-Selection AVP | O | This AVP is of type of UTF8String. This AVP shall contain the APN Network Identifier (i.e. an APN without the Operator Identifier) per 3GPP TS 23.003. It shall be present only if Service-ID AVP indicates "Device Triggering on T6a". |
| Service Parameters (see 6.4.5 of 29.336) | Service-Parameters | O | This Information Element shall contain the parameters associated to the requested service by the SCS (identified by the Service-ID AVP). In this release, only parameters associated to Device Triggering via SMS-MT (T4) and parameters associated to SMS_MO are supported. For Device Triggering via SMS-MT, this AVP may contain: Priority-Indication, SM-RP-SMEA . . . For SMS_MO, this parameter may contain: Application-Port Identifier. |
| SIR Flags (see 6.4.10 of 29.336) | SIR-Flags | M | This Information Element shall contain a bit mask. See section 6.4.10 of 29.336 for the meaning of the bits. |
| Supported Features (See 3GPP TS 29.229 [7]) | Supported-Features | O | If present, this Information Element shall contain the list of features supported by the origin host. |

Service-ID

The Service-ID AVP is of type Enumerated and it shall identify the service requested by the SCS 105. The following values are defined:

DEVICE_TRIGGER (0)

The SCS 105 requests a control plane device triggering to the UE 101.

SMS_MO (1)

The UE 101 (identified by IMSI and application port identifier) requests SMS_MO to be delivered to the SCS 105.

DEVICE_TRIGGER_ON_T6a (2)

The SCS requests a control plane device triggering to the UE via T6a interface.

Details of AVPs listed in the messages that can be employed for embodiments as described herein are described in 3GPP TS 29.336, the entirety of which is incorporated by reference hereby.

T6a Interface Changes

This section details a configuration a T6a interface to support SCS 105 initiated SCEF PDN Connection that can be employed for embodiments as described herein. The changes are configured on existing Connection Management by SCEF procedure, which is mapped to the commands Connection-Management-Request/Answer (CMR/CMA) in the Diameter application.

TABLE 2

Connection Management SCEF Request

| Information Element Name | Mapping to Diameter AVP | Cat. | Description |
|---|---|---|---|
| User Identity (See 6.4.16) | User-Identifier | M | This Information Element shall be present and shall contain the identity of the UE. This is a grouped AVP containing the IMSI. |
| EPS Bearer Identity (See 6.4.17 of 29.128) | Bearer-Identifier | C | This Information Element shall be present when T6a Connection Action indicates "T6a Connection Update". When present it shall contain the identity of the EPS bearer identifying the T6a connection to which the request applies. |
| T6a Connection Action (See 6.4.18 of 29.128) | Connection-Action | M | This Information element shall be present and shall contain a T6a connection management action indicating a T6a connection update or T6a connection establishment. |
| APN (Access Point Name) | Service-Selection | C | This Information element shall contain the APN the user would connect to. It shall be present if the request is for a T6a connection establishment as indicated by T6a Connection Action AVP. |
| Extended PCO (see 6.4.26 of 29.128) | Extended-PCO | C | This Information Element shall be present if the SCEF needs to send updated Extended PCO information (e.g. APN Rate Control information) to the UE. |

TABLE 2-continued

Connection Management SCEF Request

| Information Element Name | Mapping to Diameter AVP | Cat. | Description |
|---|---|---|---|
| Supported Features (See 3GPP TS 29.229 [4]) | Supported-Features | O | If present, this information element shall contain the list of features supported by the origin host. |

TABLE 3

Connection Management SCEF Answer

| Information Element Name | Mapping to Diameter AVP | Cat. | Description |
|---|---|---|---|
| Result (See 6.3 of 29.128) | Result-Code/ Experimental-Result | M | Result of the request. Result-Code AVP shall be used for errors defined in the Diameter Base Protocol. Experimental-Result AVP shall be used for T6a/b errors. This is a grouped AVP, which contains the 3GPP Vendor ID in the Vendor-Id AVP, and the error code in the Experimental-Result-Code AVP. |
| EPS Bearer Identity (See 6.4.17 of 29.128) | Bearer-Identifier | C | This Information Element shall be present when T6a Connection Action in the request of this transaction indicated "T6a Connection Establishment" and result call AVP indicates "Diameter-Success". When present it shall contain the identity of the EPS bearer identifying the T6a connection. |
| Requested Retransmission Time (See 3GPP TS 29.338 [27]) | Requested-Retransmission-Time | C | This information element may be present if the Experimental-Result-Code is set to DIAMETER_ERROR_USER_TEMPORARILY_UNREACHABLE. It may be included if the UE is using a power saving mechanism (such as extended idle mode DRX) and the UE is currently not reachable. When present, this shall indicate the retransmission time (in UTC) at which the SCEF is requested to retransmit the Connection Management Request. |
| Serving PLMN Rate Control (See 6.4.21 of 29.128) | Serving-PLMN-Rate-Control | O | If present, this information element shall contain the Serving PLMN rate control set by the MME. |
| CMR Flags | CMR-Flags | O | This Information Element contains a bit mask. |
| Maximum UE Availability Time (See 3GPP TS 29.338 [27]) | Maximum-UE-Availability-Time | O | This information element may be included, if available, if the Connection-Action AVP indicates a T6a connection establishment in the request sent by SCEF and the UE-Reachable-Indicator is set in the CMR-Flags AVP. When present, it shall indicate the timestamp (in UTC) until which a UE using a power saving mechanism (such as extended idle mode DRX) is expected to be reachable for MT Non-IP Data Delivery. This information may be used by the SCEF to prioritize the retransmission of MT Non-IP Data to UEs using a power saving mechanism. |
| Extended PCO | Extended-PCO | C | This Information Element shall be present, if the MME receives Extended PCO information from the UE. |
| 3GPP Charging Characteristics (See 3GPP TS 32.298 [30]) | 3GPP-Charging-Characteristics | C | This Information element shall contain the PDN Connection Charging Characteristics data for an APN Configuration with SCEF-based NIDD mechanism. It shall be present if the request is for a T6a connection establishment and may be present if the request is for a T6a connection update. |
| Supported Features (See 3GPP TS 29.229 [4]) | Supported-Features | O | If present, this information element shall contain the list of features supported by the origin host. |

Descriptions of AVP messages that can be used for embodiments as described herein are described 3GPP TS specification 29.128, the entirety of which is incorporation by redefine hereby.

NAS Interface

This section describes a configuration of the NAS Interface for Activate Default EPS Bearer Context Request Message from MME 102 to UE 101 that can be employed for embodiments as described herein.

The details on information elements the NAS Interface messages that can be employed with embodiments as described herein are given in 3GPP specification 24.301, the entirety of which is incorporated by reference hereby.

TABLE 4

ACTIVATE DEFAULT EPS BEARER CONTEXT REQUEST message content

| IEI | Information Element | Type/Reference | Presence | Format | Length |
|---|---|---|---|---|---|
| | Protocol discriminator | Protocol discriminator | M | V | ½ |
| | EPS bearer identity | EPS bearer identity | M | V | ½ |
| | Procedure transaction identity | Procedure transaction identity | M | V | 1 |
| | Activate default EPS bearer context request message identity | Message type | M | V | 1 |
| | EPS QoS | EPS quality of service | M | LV | 2-14 |
| | Access point name | Access point name | M | LV | 2-101 |
| | PDN address | PDN address | M | LV | 6-14 |
| 5D | Transaction identifier | Transaction identifier | O | TLV | 3-4 |
| 30 | Negotiated QoS | Quality of service | O | TLV | 14-22 |
| 32 | Negotiated LLC SAPI | LLC service access point identifier | O | TV | 2 |
| 8- | Radio priority | Radio priority | O | TV | 1 |
| 34 | Packet flow Identifier | Packet flow Identifier | O | TLV | 3 |
| 5E | APN-AMBR | APN aggregate maximum bit rate | O | TLV | 4-8 |
| 58 | ESM cause | ESM cause | O | TV | 2 |
| 27 | Protocol configuration options | Protocol configuration options | O | TLV | 3-253 |
| B- | Connectivity type | Connectivity type | O | TV | 1 |
| C- | WLAN offload indication | WLAN offload acceptability | O | TV | 1 |
| 33 | NBIFOM container | NBIFOM container | O | TLV | 3-257 |
| 90 | Header compression configuration | Header compression configuration | O | TLV | 3-TBD |
| 91 | Control plane only indication | Control plane only indication | O | T | 1 |

PDN Address

Figure 8:
FIG. 8 shows an embodiment of a PDN address element.

The PDN address information element is configured to assign an IPv4 address to a UE 101 associated with a packet data network and to provide the UE 101 with an interface identifier to be used to build the IPv6 link local address. The PDN address is a type 4 information element with minimum length of 7 octets and a maximum length of 15 octets. In an embodiment, the PDN address information element is coded as shown in FIG. 8 and FIG. 9.

An MTC UE 101 can be attached to a 3GPP based EPC network without a PDN Connection by supporting a Control plane for a Cellular Internet of Things (CIoT) EPS optimization feature. An indirect model and hybrid model of embodiments of a MTC architecture to support Non IP Data Delivery via an SCEF 104 as described herein provides a number of exemplary advantages. For example, embodiments as described herein can be configured to avoid Diameter signaling messages completely on a T4 interface and SGd interface. Also, the MME 102 does not have to be configured to support SMS in MME 102 architecture as there is an explicit Device Trigger Delivery via SMS. Another exemplary advantage is that the signaling messages between MTC-UE 101 and SCS/AS 105 are reduced, thereby achieving the goal of a non IP data transfer via a SCEF 104 with indirect and hybrid models of communication between MTC-UE 101 and MTC AS.

Systems and components thereof can comprise a central processing unit (CPU) or any other processor. The input unit can comprise a receiver, transceiver or any other means for receiving. The output unit can comprise a transmitter, transceiver or any other means for transmitting. The input unit and the output unit of the apparatus can be functionalities running on the processor of the apparatus or alternatively can be separate functional components. They can also be implemented as integral transceivers. The input unit and the output unit can be implemented e.g. as physical transmitters/receivers for transceiving via an interface, as routing entities for sending/receiving data packets in a PS (packet switched) network, or as any suitable combination thereof. Systems and components thereof can also exchange information over internal interfaces.

Each component can be configured to process various data inputs and to control the input unit and the output unit. Each component can further comprise a memory. The memory can serve to store code for carrying out the methods according to the examples of the present embodiments.

One of ordinary skill in the art will appreciate that the architecture of systems described herein are non-limiting examples that is illustrative of at least a portion of at least one embodiment. As such, more or less components can be employed and/or arranged differently without departing from the scope of the innovations described herein. However, the system architectures and processed described herein are sufficient for disclosing at least the innovations claimed herein.

Third Generation Partnership Project (3GPP) technology standards and reports are referred to herein, and the entirety of each of these are incorporated by reference hereby, including:

[TS 23.682] Architecture enhancements to facilitate communications with packet data networks and applications (Release 15.2).

[TS 29.128] Mobility Management Entity (MME) and Serving GPRS Support Node (SGSN) interfaces for interworking with packet data networks and applications (Release 14.3).

[TR 23.720] Study on architecture enhancements for Cellular Internet of Things (Release 13).

[TS 29.337] Diameter-based T4 Interface for communications with packet data networks and applications (Release 14.1).

[TS 29.336] Home Subscriber Server (HSS) diameter interfaces for interworking with packet data networks and applications (Release 14.2).

[TS 29.368] Tsp interface protocol between the MTC Interworking Function (MTC-IWF) and Service Capability Server (SCS) (Release 14.2).

[TS 24.301] Non-Access-Stratum (NAS) protocol for Evolved Packet System (EPS); Stage 3 (Release 13).

[TS 23.401] Evolved Universal Terrestrial Radio Access Network (E-UTRAN) access (Release 15.0).

[TS 22.368] Study on enhancements for Machine-Type Communications (MTC) v 14.0.1 (Aug. 28, 2017).

[TS 23.888] System improvements for Machine-Type Communications (MTC) 11.0.0 (18 Sep. 2017).

[TR 21.905] Vocabulary for 3GPP Specifications (version 14.1.1 Release 14).

It will be understood that each block of the illustrated flowchart, and combinations of blocks in the flowchart, can be implemented by computer program instructions. These program instructions can be provided to a processor to produce a machine, such that the instructions, which execute on the processor, create means for implementing the actions specified in the flowchart block or, blocks. The computer program instructions can be executed by a processor to cause a series of operational steps to be performed by the processor to produce a computer-implemented process such that the instructions execute on the processor to provide steps for implementing the actions specified in the flowchart block or blocks. The computer program instructions can also cause at least some operational steps shown in the blocks of the flowchart to be performed in parallel. Moreover, some steps can also be performed across more than one processor, such as in a multi-processor computer system or even a group of multiple computer systems. In addition, one or more blocks or combinations of blocks in the flowchart can also be performed concurrently with other blocks or combinations of blocks.

Accordingly, blocks of the illustrated flowchart support combinations for performing the specified actions, combinations of steps for performing the specified actions and program instruction for performing the specified actions. It will also be understood that each block of the flowchart, and combinations of blocks in the flowchart, can be implemented by special purpose hardware-based systems, which perform the specified actions or steps, or combinations of special purpose hardware and computer instructions. The foregoing examples should not be construed as limiting and/or exhaustive.

It is be understood by those skilled in the art that various modifications, combinations, sub-combinations and alterations may occur depending on design requirements and other factors insofar as they are within the scope of the present disclosure.

The invention claimed is:

1. A method for control plane device triggering, comprising:
   receiving a device action trigger request message from an originating Machine-type communication server (MTC Server) for user equipment (UE) into a Service Capability Exposure Function (SCEF) Server;
   sending a connection management request from the SCEF Server to a Mobility Management Entity (MME) Server via an interface connecting the SCEF Server and the MME Server, the connection management request not including an Evolved Packet System (EPS) bearer ID allocation;
   establishing a personal communications network connectivity procedure between the UE and the MME Server; and
   generating and sending a connection management answer from the MME Server to the SCEF Server.

2. The method of claim 1, wherein interface connecting the SCEF Server and the MME Server is a T6a interface.

3. The method of claim 2, wherein the SCEF Server initiates a new Packet Data Network (PDN) Connection request towards the MME Server on the T6a interface.

4. The method of claim 2, wherein the SCEF Server sends a Connection Management Request message to the MME Server via the T6 interface.

5. The method of claim 4, wherein the MME Server identifies that an Access Point Name APN in the request from the SCEF Server is a non IP based APN.

6. The method of claim 4, wherein, if the UE is reachable or about to be reachable, the MME Server initiates an Evolved Packet System (EPS) default bearer allocation and Packet Data Network (PDN) connection establishment procedure towards the UE, by sending an EPS Default Bearer Request message to support non IP Data transfer.

7. The method of claim 6, wherein, when the MME Server detects the UE has become reachable or is about to become reachable, the MME Server initiates a T6a connection establishment procedure towards the SCEF Server, for the stored non IP Access Point Name (APN) indicated from SCEF Server in the Connection Management Request message to the MME Server; and
   the SCEF Server notifies an AS on the outcome of a device trigger delivery by sending Device Notification Request command to the AS.

8. The method of claim 7, wherein upon receiving the confirmation from MME Server, the SCEF sends a Device Action Answer/Confirm message to an SCS.

9. The method of claim 8, further comprising a Device-Notification Attribute-value pair (AVP) in the Device Action Answer/confirm message that is set with a "Device Trigger Via SCEF" value to confirm that the Device Trigger Request has been accepted by the UE.

10. The method of claim 4, wherein, if the MME Server determines the UE is unreachable, the MME sends a Connection Management Answer message indicating that the UE is temporarily not reachable to the SCEF, and wherein the MME is configured to notify the SCEF Server when the MME Server determines the UE is reachable.

11. The method of claim 10, wherein the MME Server stores an Access Point Name (APN) from EPS Session Management (ESM) for the UE and a mark Reachable NIDD flag for EPS Mobility Management for the UE.

12. The method of claim 10, wherein the SCEF Server upon receiving a Connection Management Answer command from MME Server, is configured to indicate the same to the MTC Server in a Device Action Answer message; and the SCEF Server starts a timer with Maximum Retransmission Timer after which it can retry the Connection Management Request message to the MME Server.

13. The method of claim 10, wherein when the MME Server determines the UE is unreachable, the MME Server stores an Access Point Name (APN) for EPS Session Management (ESM) for the UE and a mark Reachable for Non-IP Data Delivery (NIDD) flag for EPS Mobility Management (EMM) for the UE; and when the MME Server detects the UE has become reachable or is about to become reachable, the MME Server clears the Reachable for NIDD flag for EMM.

14. The method of claim 1, wherein the MTC Server is a Service Capability Server (SCS) or an Application Server (AS).

15. The method of claim 1, wherein an Action Type field of the device action trigger request message includes a Device Trigger Via SCEF field.

16. The method of claim 1, wherein a Home Subscriber Service (HSS) determines if an Access Point Name (APN) received in a Service-Selection Attribute-value pair (AVP) is the APN that a subscriber identified by a Mobile Station International Subscriber Directory Number (MSISDN) or an External Identifier for the UE subscribed for.

17. The method of claim 1, wherein the SCEF Server selects the MME Server based on a service node ID information received from an HSS in a Subscriber Information Answer.

18. The method of claim 1, wherein the SCEF Server includes a MTC Interworking Function (MTC-IWF).

19. A Service Capability Exposure Function (SCEF) Server computer comprising a program memory comprising instructions configured to, when executed by a processor, implement a T6 Interface configured to support a Service Capability Server (SCS) initiated SCEF Packet Data Network (PDN) connection comprising a Content Management Request Message comprising an Evolved Packet System (EPS) Bearer Identity element.

20. The SCEF Server T6 Interface of claim 19, wherein the Content Management Request Message is a Connection Management SCEF Request comprising:

the EPS Bearer Identity element configured include the identity of an EPS bearer identifying the T6a connection to which the request applies; and an Access Point Name (APN) element configured to be present for a T6a connection establishment request as indicated by T6a Connection Action Attribute value pair (AVP).

21. The SCEF Server T6 Interface of claim 19, wherein the Content Management Message is a Connection Management Answer from an MME Server to the SCEF Server comprising the EPS Bearer Identity allocated by the MME Server, the Connection Management Answer being configured to include the identity of and EPS bearer identifying the T6a connection to which the request applies and an element selected from the group of:

a Requested Retransmission on Time element;
a Serving Public Land Mobile Network (PLMN) Rate Control element;
a Connection Management Request (CMR) Flags element;
a Maximum User Equipment (UE) Availability Time element;
an Extended Protocol Configuration Options (PCO) element; and
a Charging Characteristics element.

22. A Services Capability Server (SCS) comprising a program memory comprising instructions configured to, when executed by a processor, implement a Tsp Interface to an Machine Type Communication Inter Working Function (MTC-IWF) component and configured to support SCS Initiated Device Trigger Delivery to establish a Service Capability Exposure Function (SCEF) Packet Data Network (PDN) Connection in an Indirect Model of Machine Type Communication (MTC) Architecture comprising:

a Device Trigger Via SCEF element.

23. A Services Capability Server (SCS) comprising a program memory comprising instructions configured to, when executed by a processor, implement an S6 Interface to a Home Subscriber Service (HSS) configured to support a Services Capability Server SCS Initiated Device Trigger Delivery to establish a Service Capability Exposure Function (SCEF) Packet Data Network (PDN) Connection in Indirect Model of Machine Type Communication Architecture comprising:

a Requested Service element; and
a Service Selection element comprising an APN Network Identifier,
wherein a Service ID value for the Requested Service element includes a Device Triggering on a T6 device trigger value.

24. A system comprising:

a Service Capability Exposure Function (SCEF) Server including an interface connecting the SCEF Server to a Mobility Management Entity (MME) Server;

the SCEF Server comprising a computer processor and program memory comprising instructions configured to, when executed by the processor:

receive a device action trigger request message from an originating Machine-type communication server (MTC Server) for user equipment (UE);

send a connection management request from the SCEF Server to the MME Server via the interface connecting the SCEF Server and the MME Server, the connection management request not including an Evolved Packet System (EPS) bearer ID allocation; and receive a connection management answer from the MME Server via the interface;

wherein the SCEF Server is configured to establish a personal communications network connectivity procedure between the UE and the MME Server.

25. The system of claim 24, further comprising:

the MME Server, wherein the MME Server comprises a computer processor and program memory comprising instructions configured to, when executed by the processor, generate and send the connection management answer from the MME Server to the SCEF Server.

26. The system of claim 24, wherein interface connecting the SCEF Server and the MME Server is a T6a interface.

27. The system of claim 26, wherein the SCEF Server program memory includes instruction configured to, when executed by the processor, initiate a new Packet Data Network (PDN) Connection request towards the MME on the T6a interface.

28. The system of claim 26, wherein the SCEF Server program memory includes instructions configured to, when executed by the processor, send a Connection Management Request message to the MME Server via the T6 interface.

29. The system of claim 28, wherein the MME Server program memory includes instructions configured to, when executed by the processor, identify that an Access Point Name APN in the request from the SCEF Server is a non IP based APN.

30. The system of claim 28, wherein the MME Server program memory includes instructions configured to, when executed by the processor, initiate an Evolved Packet System (EPS) default bearer allocation and Packet Data Network (PDN) connection establishment procedure towards the UE by sending an EPS Default Bearer Request message to support non IP Data transfer if the UE is reachable or about to be reachable.

31. The system of claim 30, wherein the MME Server program memory includes instructions further configured to, when executed by the processor, detect when the UE has become reachable or is about to become reachable and, when detected, initiate a T6a connection establishment procedure towards the SCEF Server, for the stored non IP Access Point Name (APN) indicated from SCEF Server in the Connection Management Request message to the MME Server; and the SCEF Server is configured to initiate an AS on the outcome of a device trigger delivery by sending Device Notification Request command to an AS.

32. The system of claim 31, wherein the MME Server program memory includes instructions further configured to, when executed by the processor, determine if the UE is unreachable and, when determined unreachable, store an Access Point Name (APN) for EPS Session Management (ESM) for the UE and a mark Reachable for Non-IP Data Delivery (NIDD) flag for EPS Mobility Management (EMM) for the UE; and when the MME Server detects the UE has become reachable or is about to become reachable, the MME is configured to clear the Reachable for NIDD flag for EMM.

33. The system of claim 28, wherein the MME Server program memory includes instructions configured to, when executed by the processor, send a Connection Management Answer message indicating that the UE is temporarily not reachable to the SCEF Server and, if the MME Server determines the UE is unreachable, the MME Server program memory includes instructions further configured to, when executed by the processor, at least notify the SCEF when the MME determines the UE is reachable.

34. The system of claim 33, wherein the MME Server program memory includes instructions configured to, when executed by the processor, store an Access Point Name (APN) from EPS Session Management (ESM) for the UE and a mark Reachable NIDD flag for EPS Mobility Management for the UE.

35. The system of claim 33, wherein the SCEF Server program memory includes instructions further configured to, when executed by the processor, upon receiving a Connection Management Answer command from the MME Server, indicate the same to the MTC Server in a Device Action Answer message; and the SCEF Server is configured to start a timer with Maximum Retransmission Timer after which it can retry the Connection Management Request message to the MME.

36. The system of claim 24, wherein the SCEF Server includes a MTC Interworking Function (MTC-IWF).

37. The system of claim 24, wherein the MTC Server is a Service Capability Server (SCS) or an Application Server (AS).

* * * * *